United States Patent [19]

Minasy et al.

[11] E Re. 29,610

[45] Reissued Apr. 11, 1978

[54] FIELD STRENGTH UNIFORMITY CONTROL SYSTEM

[75] Inventors: Arthur J. Minasy, Woodbury; Ronald Pruzick, Commack, both of N.Y.

[73] Assignee: Knogo Corporation, Hicksville, N.Y.

[21] Appl. No.: 575,153

[22] Filed: May 7, 1975

Related U.S. Patent Documents

Reissue of:

[64] Patent No.: 3,838,409
Issued: Sep. 24, 1974
Appl. No.: 351,018
Filed: Apr. 13, 1973

[51] Int. Cl.[2] ..... G08B 13/24

[52] U.S. Cl. ..... 340/280; 323/125; 325/180; 340/258 C

[58] Field of Search ..... 340/258 C, 280; 323/126, 125, 122, 121; 325/180

[56] References Cited

U.S. PATENT DOCUMENTS

| | | | |
|---|---|---|---|
| 1,853,021 | 4/1932 | Alexanderson | 325/180 |
| 1,915,786 | 6/1933 | Hammond, Jr. | 325/180 |
| 2,317,071 | 4/1943 | Luck | 325/180 |
| 2,524,760 | 10/1950 | Brown | 323/125 |
| 3,500,373 | 3/1970 | Minasy | 340/280 |
| 3,665,449 | 5/1972 | Elder et al. | 340/280 |
| 3,676,772 | 7/1972 | Lee | 340/258 C |
| 3,740,742 | 6/1973 | Thompson et al. | 340/280 |
| 3,755,803 | 8/1973 | Cole et al. | 340/280 |
| 3,820,104 | 6/1974 | Fearon | 340/280 |
| 3,891,980 | 6/1975 | Lewis et al. | 340/258 C |
| 3,938,125 | 2/1976 | Benassi | 340/258 R |

FOREIGN PATENT DOCUMENTS

| | | | |
|---|---|---|---|
| 763,681 | 5/1934 | France | 340/258 C |

*Primary Examiner*—Glen R. Swann, III
*Attorney, Agent, or Firm*—Fitzpatrick, Cella, Harper & Scinto

[57] ABSTRACT

An electromagnetic interrogation field in a theft detection system is made effectively more uniform by energizing different antenna windings lying in different planes at the same frequency but at different phases so that the resulting field pattern rotates in the vicinity of the antenna windings.

18 Claims, 11 Drawing Figures

FIELD STRENGTH UNIFORMITY CONTROL SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to electronic theft detection systems and more particularly it concerns novel arrangements for maintaining the vicinity of a theft detection checkpoint substantially uniformly filled with an electromagnetic interrogation field.

2. Description of the Prior Art

The present invention is especially suitable for use in conjunction with electronic theft detection systems of the type described in U.S. Pat. Nos. 3,493,955 and 3,500,373. In both systems, each of the articles to be protected from theft has a electronic responder circuit attached to it. This circuit may be concealed in a wafer like element which may also serve as a price label or the like for the protected article. The articles are maintained in an enclosure having limited egress and checkpoints are set up at each egress. A transmitter is provided at the checkpoint to transmit an interrogation signal and receiver means are provided to note any response produced by the interaction of a wafer responder circuit with the transmitted signal field in the vicinity of the checkpoint. In the case of the systems described in U.S. Pat. No. 3,493,955, the wafer responder circuits respond to the transmitted interrogation signal, which is at first frequency, to produce a response signal at a second frequency. The receiver means are tuned to detect this second frequency.

In the case of the system described in U.S. Pat. No. 3,500,373, the wafer responder circuits are resonant circuits tuned to resonate at the transmitted interrogation frequency. When these wafer responder circuits are brought into the transmitted interrogation signal field they absorb some of the transmitted energy. The receiver means monitors the transmitted signal, which changes in amplitude due to this absorption. In order to maximize sensitivity the transmitter of this system produces an output frequency which sweeps cyclically over a given range which includes the resonant frequency of the wafer responder circuits. This causes a series of responses in the form of impulses which occur at a repetition rate corresponding to the frequency sweep rate.

The ability of a responder circuit to function effectively in any electronic theft detection system depends upon the degree to which the interrogation field is incident upon the responder circuit. Since these responder circuits are generally in flat wafer-like form, they exhibit different degrees of sensitivity depending upon their orientation with respect to the interrogation antenna. In order to accomodate the different attitudes which responder devices may assume when carried through a checkpoint there has been developed a plural antenna system comprising at least two antennas positioned at right angles to each other at the checkpoint. The two antennas are energized simultaneously so that as a responder circuit is turned away from one interrogation antenna it turns toward the other interrogation antenna so that sensitivity is maintained. This plural interrogation antenna system is shown and described in U.S. Pat. No. 3,493,955.

The present invention is directed to a somewhat related but different problem than the orientation problem described above. It has been found that even plural interrogation antenna systems produce an uneven electromagnetic field energy distribution throughout the vicinity of a checkpoint. This occurs as a result of the additive and subtractive effects of the fields produced by the different antennas. As a result of these effects there are developed "dead zones" or regions of minimal electromagnetic field intensity. If a responder circuit is caused to follow a path through the dead zone regions of a checkpoint only minimal interaction will occur between the interrogation signal and the responder circuit and it is possible that the passage of the responder circuit through the checkpoint will not be detected.

SUMMARY OF THE INVENTION

The present invention overcomes the above described field distribution problems and provides an interrogation field in which dead zones are effectively minimized.

According to the present invention there are provided at least two interrogation antennas at a checkpoint. These antennas are positioned in different planes, preferably at right angle to each other. The antennas are energized simultaneously at the same interrogation frequency. However this energization is controlled so that a phase difference exists in the energization of the different antennas. Preferably this phase difference is 90°. As a result of the energization of antennas lying in different planes with signals of different phase, there is produced in the vicinity of the checkpoint a rotating electromagnetic field. Thus, while a dead zone may exist in the field at any given orientation thereof, the rotation of the field causes the dead zone to move so that the entire region of the checkpoint is effectively filled with the electromagnetic field. In effect the dead zones are eliminated and the responder circuits are more likely to be detected.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures and other methods for carrying out the several purposes of the invention. It is important, therefore, that the claims be regarded as including such equivalent structures and methods as do not depart from the spirit and scope of the invention.

BRIEF DESCRIPTION OF THE DRAWINGS

A specific embodiment of the invention has been chosen for purposes of illustration and description, and is shown in the accompanying drawings forming a part of the specification, wherein.

DESCRIPTION OF THE PREFERRED EMBODIMENT

Figures 1, 2, 3:
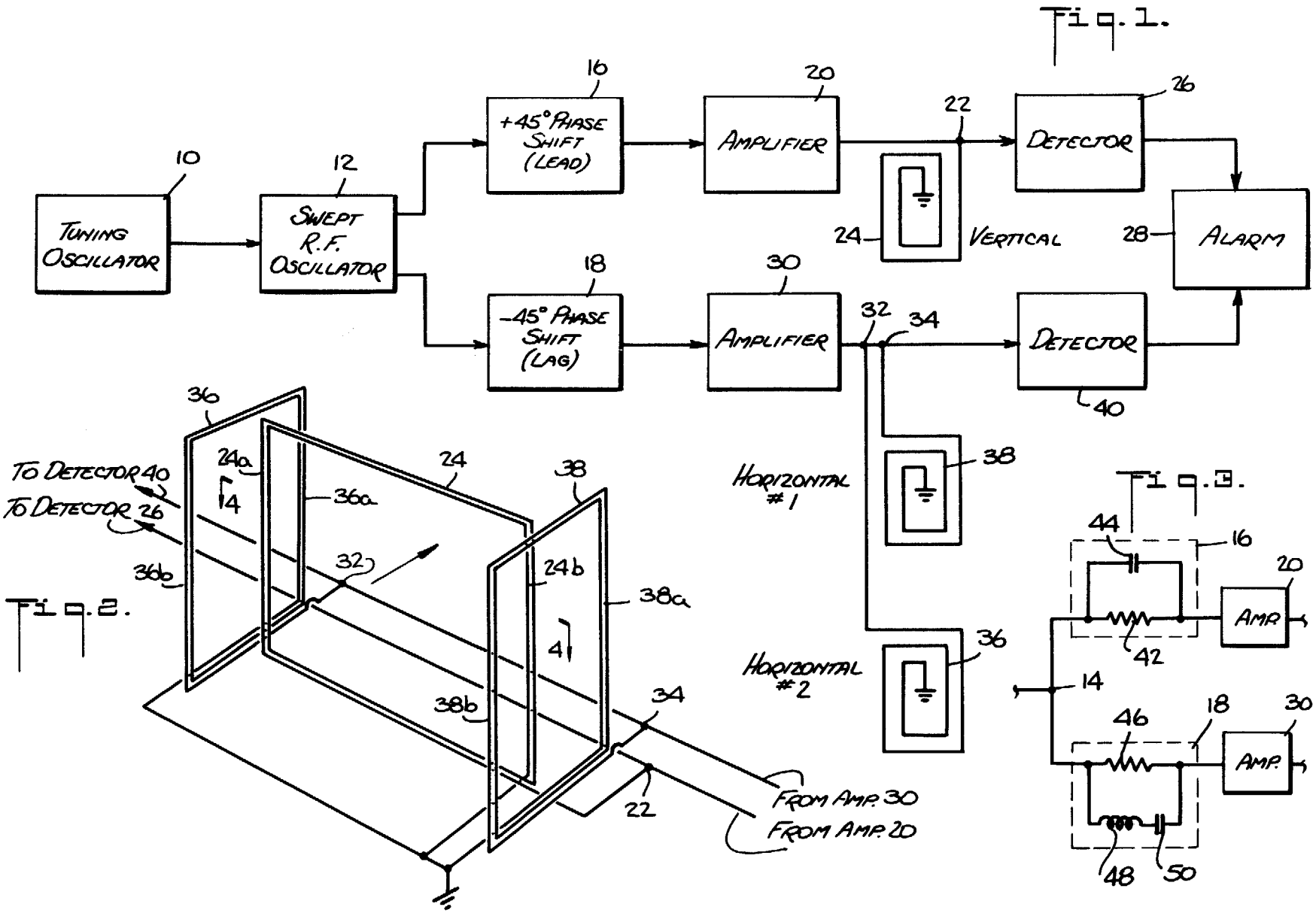
FIG. 1 is a block diagram of a swept frequency electronic theft detection system in which the present invention is embodied.
FIG. 2 is a perspective view illustrating the arrangement of antenna coils according to the present invention.
FIG. 3 is a fragmentary circuit diagram showing phase shifting circuits used in the system of FIG. 1.
Figure 4A:
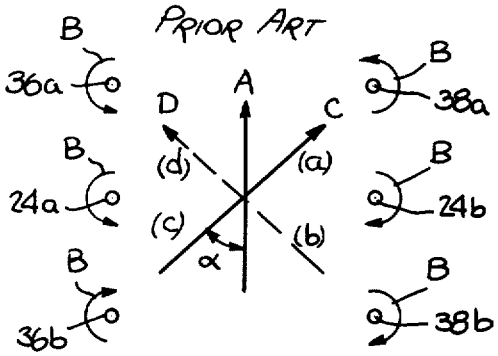
FIGS. 4 A–D are diagramatic representations showing magnetic field relationships around portions of antenna coils during antenna energization at different intervals in a cycle of energization according to the prior art.

The swept frequency theft detection system of FIG. 1 is, in part, like that shown and described in U.S. Pat. No. 3,500,373. As shown, there is provided a tuning oscillator 10 which produces a voltage whose amplitude varries at a given rate, e.g., 300 cycles per second. This varying voltage is applied to a voltage tuneable swept radio frequency oscillator 12 which is designed to produce an output voltage which is nominally 2 megahertz (MHZ). When the oscillator 12 is controlled by the tuning oscillator 10 however, its output frequency is swept between 1.95 MHZ and 2.05 MHZ at a 300 cycle per second rate.

The swept frequency output of the oscillator 12 is supplied to a junction 14 (see FIG. 3) from which it branches to "lead" and "lag" phase shifts 16 and 18. These phase shifters, which will be described in greater detail hereinafter in connection with FIG. 3 act, respectively, to advance and retard the phase of the signals applied to them. In the case of the lead phase shifter 16, the signal phase is advanced by approximately 45°, while in the case of the lag phase shifter, the signal phase is retarded by approximately 45°. There is thus produced a net phase differential of 90° at the outputs of the two phase shifters 16 and 18.

The output of the lead phase shifter 16 is applied to an amplifier 20; and the output of this amplifier is applied to a transverse antenna junction 22. A transverse antenna winding 24 is connected to the junction 22. The junction 22 is also connected to a first detector 26; and this is in turn connected to an alarm 28.

The output of the lag phase shifter 18 is applied to an amplifier 30; and the output of this amplifier is applied to a pair of lateral antenna junctions 32 and 34.

Each of the detectors 26 and 40; and the alarm 28 may be constructed and arranged as described in connection with FIG. 2. As is there shown, the transverse antenna winding 24 comprises a multiturn coil lying in a plane which is substantially perpendicular to a path of egress (indicated by an arrow A) through a checkpoint. Various physical means (not shown) are provided to confine the movement of protected articles, which are equipped with electronic responder circuits, so that they can exit from an enclosure only via the path shown by the arrow A. The protected article thus must pass either through or very near the transverse antenna winding 24 during egress from the enclosure.

The two lateral antenna windings 36 and 38 also comprise multiturn coils. However these antennas are arranged on opposite sides of the egress path with their planes oriented parallel to the path and perpendicular to the plane of the transverse antenna winding 24.

As shown in FIG. 2, all of the antenna windings have one end connected to ground. The opposite end of the transverse antenna winding 24 is connected to the junction 22 while the opposite end of the lateral antenna windings are connected to the junctions 32 and 34.

The system of FIGS. 1 and 2 operates to detect the presence of resonant responder circuits (not shown) carried on protected articles which pass through and by the antenna windings 24, 36 and 38 along the egress path. The responder circuits are tuned to resonate at a frequency within the sweep range of the oscillator 12. Thus the responder circuits may be tuned to resonate at 2 MHZ.

When no responder circuit is present in the egress path, a relatively high impedance is presented to the antenna windings and most of the energy from the amplifiers 20 and 30 passes by the junctions 22, 32 and 34 and becomes incident upon the detectors 26 and 40. As long as a relatively constant energy level is applied to the detectors they do not produce any alarm actuating signal.

When a responder circuit passes by or through the antenna windings, it resonates and absorbs energy each time the frequency of the oscillator 12 sweeps by the resonant frequency of the responder circuit. When the responder circuit is tuned to resonate at 2 MHZ and the oscillator frequency sweep between 1.95 MHZ and 2.05 MHZ, this resonant response occurs twice during each sweep cycle or at a 600 response per second rate. The resonant responses cause a decrease in impedance in the vicinity of the antenna windings so that more of the transmitted energy passes out from the windings during the resonant response. This results in a decrease in the energy level applied to the detectors 26 and 40. The detectors, as described in U.S. Pat. No. 3,500,373, are provided with special arrangements for detecting these energy decreases and for actuating the alarm 28 when they occur.

The phase shifters 16 and 18 may be of any suitable construction which will produce a difference in phase between the lateral and transverse antenna windings. The particular phase shifter construction shown in FIG. 3 has been found to be quite suitable for the present application. As shown in FIG. 3, the lead phase shifter 16 comprises a resistor 42 connected in series between the junction 14 and the amplifier 20. A capacitor 44 is connected across the resistor 42. The lag phase shifter 18 comprises a resistor 46 connected in services between the junction 14 and the amplifier 30. An inductor 48 and a capacitor 50 are together connected across the resistor 46. It has been found that when the resistor 42 is about 680 ohms and the capacitor 44 is about 150 picofarads the lead phase shifter 16 will produce a phase shift of close to +45° for frequencies in the range of 1.95 – 2.05 MHZ. Also when the resistor 46 is about 680 ohms and the inductor 48 is about 47 microhenries, the lag phase shifter will produce a phase shift of close to −45° for frequencies in the range of 1.95 – 2.05 MHZ. The capacitor 50 is used to prevent short circuiting of the resistor 46 by the inductor 48; and it has been found that this capacitor will serve this function without adversely affecting phase shift for the frequencies mentioned when its capacitance is approximately 0.1 microfarad.

The phase shifters 16 and 18 may be adjusted to produce any differential in the net phase shift between the lateral and transverse antenna windings. However, as will be seen, a 90° net phase shift should produce a more uniform field distribution with the antenna arrangement of FIG. 2. Also, it is not necessary that two separate phase shifters be used. A single phase shifter capable of producing a 90° phase shift in the signal to one of the amplifiers 20 or 30 would produce a similar result. The use of two phase shifters, each of which produces only a 45° phase shift, however, permits a more accurate phase shift over the frequency sweep range with less expensive construction. Also it has been found that the frequency sensitivity of the two phase shifters 16 and 18 is complimentary during the 1.95 to 2.05 MHZ frequency sweep. Thus when the frequency at any instant is such that the lead phase shifter 16 produces less lead, that same frequency causes the lag phase shifter 18 to produce greater lag so that the net phase difference remains essentially the same as frequency shifts.

The manner in which the above described antenna orientation and phase shifted antenna excitation serves to produce a revolving field which eliminates dead zones can be seen in a comparison of FIGS. 4 and 5. FIGS. 4 and 5 each comprise a group of section views taken along line 4—4 of FIG. 2. These section views sever the vertical portions of both the transverse and horizontal antenna windings 24, 36 and 38. Thus there are shown severed ends of vertical portions 24a and 24b of the transverse antenna winding 24, severed ends of the vertical portions 36a and 36b of the lateral antenna winding 36 and severed ends the vertical portions 38a and 38b of the lateral antenna winding 38. As can be seen in FIG. 2, when current flows upwardly in the vertical portion 24a, it flows downwardly in the opposite vertical portion 24b. This also applies to vertical portions 36a and 36b and 38a and 38b. Reverse current flows occur, of course, during one half of each cycle of antenna energization.

The flow of current through the various antenna windings is accompanied by a circular magnetic field surrounding the winding wires as illustrated by arrows B in FIGS. 4 and 5. The direction of the various circular magnetic fields B corresponds to the direction of current flow through the winding which each field surrounds. Thus, the direction of the circular magnetic field reverses itself upon each half cycle of antenna energization.

The distribution of electromagnetic energy in the vicinity of the egress path A will now be described with regard to the magnetic fields B produced by currents in the antenna windings 24, 36 and 38.

In the successive 90° intervals of antenna energization represented by FIGS. 4A–D, each of the three antenna windings 24, 36 and 38 is energized in phase, according to the prior art. Thus all antenna windings conduct maximum current at the same time and all antenna windings conduct zero current at the next following 90° interval.

The major direction of magnetic field strength, which is represented by an arrow C in FIG. 4 is determined according to the mutual additive and subtractive effects of the circular magnetic fields B in the various antenna windings. As can be seen in FIG. 4A, the major magnetic field energization C is at an angle $\alpha$ with respect to the path A. After the next 90° interval the magnetic field energization diminishes to zero as shown in FIG. 4B. Thereafter as shown in FIG. 4C, the major magnetic field energization C is again at the angle $\alpha$ with respect to the egress path A, but is reversed in direction. Finally, as shown in FIG. 4D, after the last 90° interval the magnetic field strength again diminishes to zero.

Figure 5A:
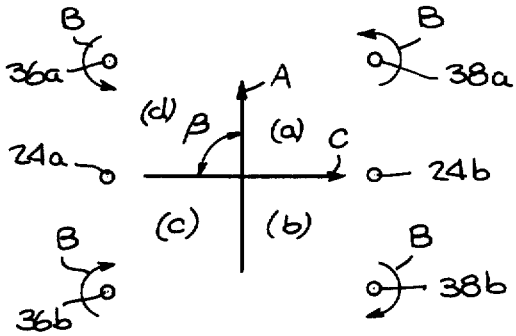
FIGS. 5 A–D are views similar to FIGS. 4 A–D but showing magnetic field relationships at different intervals in a cycle of energization according to the present invention.
Figure 4B:
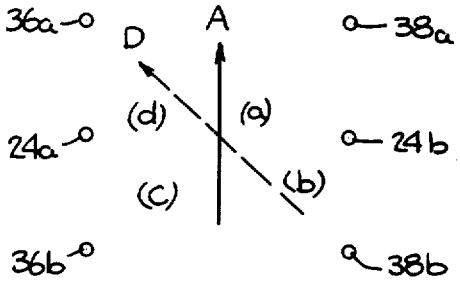
Figure 5B:
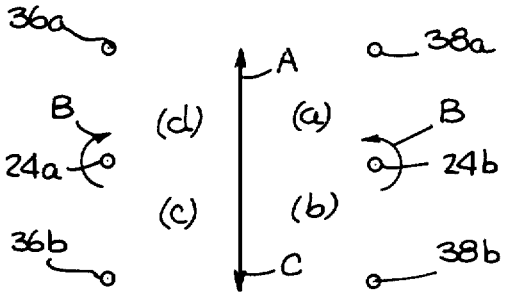
Figure 4C:
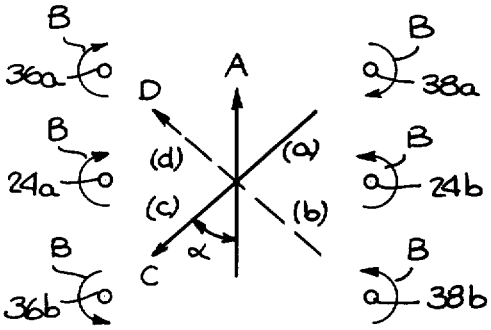
Figure 5C:
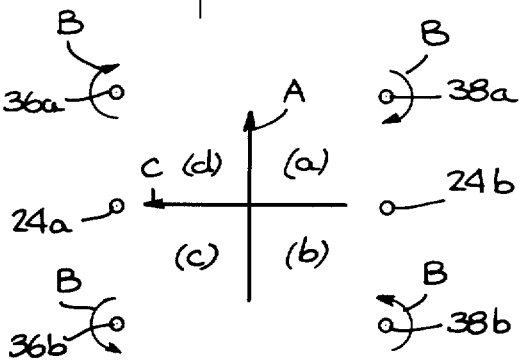
Figure 4D:
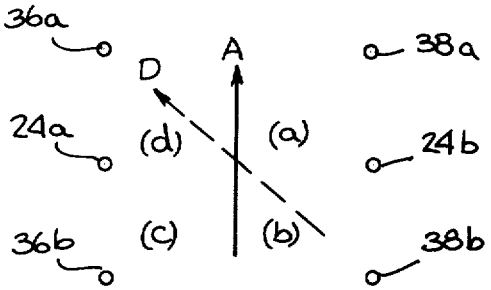
Figure 5D:
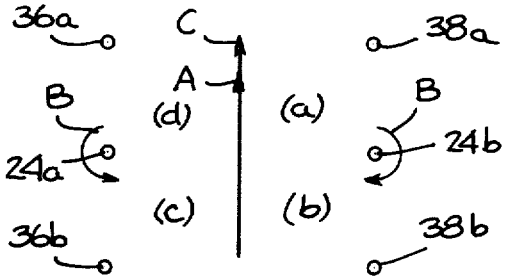

It will be appreciated from FIG. 4 that the major magnetic field strength C always lies along a path which crosses the egress path A at an angle $\alpha$. Also by considering the additive and subtractive effects of the circular magnetic fields B within the various quadrants (a), (b), (c) and (d), it will be seen that a minimum magnetic field strength is always present in quadrants (b) and (d) while maximum magnetic field strength is present only in quadrants (a) and (c). Thus, by taking care to traverse the checkpoint along a path indicated by the dashed arrow D, one can cross the path of maximum field strength at substantially a right angle to it and thereby minimize the duration required to pass through the high intensity region of the field. Also, by following the path of the arrow D, one will traverse the checkpoint via the quadrants (b) and (d) of minimum field energization. These quadrants make up dead zones within which only minimal response can be obtained from a rebroadcaster circuit. As a result a possibility exists in this prior art arrangement, for a protected article to pass through a checkpoint undetected if it follows a particular path. Turning now to FIG. 5, wherein operation according to the present invention is shown, it will be seen that the transverse antenna winding 24 is energized at a 90° phase relationship to the energization of the lateral antennas 36 and 38. As can be seen in FIG. 5A, when maximum current flows through the lateral antenna windings 36 and 38, no current flows through the transverse antenna winding 24. The additive and subtractive effects of the circular magnetic fields B are such that they produce a net maximum magnetic field energization C which is at a right angle $\beta$ to the egress path A. After the next 90° interval, as seen in FIG. 5B, the current through the lateral antenna windings 36 and 38 diminishes to zero and the current through the transverse antenna winding 24 becomes maximum. The net effect is to swing the maximum magnetic field energization C into alignment with the egress path A. Thereafter, after the next 90° interval of antenna energization, as shown in FIG. 5C, current in the transverse antenna winding 24 diminishes to zero while current through the lateral antenna windings 36 and 38 again reaches maximum in the opposite direction from that shown in FIG. 5A. This causes the maximum magnetic field energization C to swing further around until it again is at a right angle $\beta$ to the egress path A. Finally after the last 90° interval of antenna energization, as seen in FIG. 5D, the circular magnetic fields B cause the maximum magnetic field energization to swing back along the egress path direction A.

It will be appreciated that by interpolation it can be shown that the maximum magnetic field vector C revolves circularly during antenna energization. Thus any dead zones are swept around and the entire vicinity of the egress path A is electromagnetically energized uniformly. Further, since the electromagnetic field pattern moves continuously there is no path along which one may pass in which the magnetic field strength is always minimal. Thus there is provided a means for improving the detection reliability of responder circuits in electronic theft detection system.

While the invention has been described with reference to the preferred form thereof, it will be obvious to those skilled in the art to which the invention pertains, after understanding the invention, that various changes and modifications may be made therein without departing from the spirit and scope of the invention, as defined by the claims appended hereto.

What is claimed is:

[1. In an article theft detection system the combination of at least two antenna windings mounted in the vicinity of a checkpoint along an article egress path, said antenna windings lying in different planes, an oscillator for generating high frequency electrical signals, signal transmission means connected between said oscillator and said antenna windings to energize said windings from said oscillator, said signal transmission means including means forming separate signal paths to the antenna windings lying in the different planes and phase shift means in at least one of said signal paths for producing a relative phase difference between the signals applied to the different antenna windings.]

[2. An article theft detection system according to claim 1 wherein the planes of said two antenna windings are arranged traversely to each other and wherein said phase shift means is operative to produce a net relative phase difference of 90° between the signals applied to the different antenna windings.]

[3. An article theft detection system according to claim 2 wherein at least one antenna winding encircles said egress path and lies in a plane perpendicular to said egress path.]

[4. An article theft detection system according to claim 3 wherein two additional antenna windings lie in planes parallel to said egress path.]

[5. An article theft detection system according to claim 4 wherein said one antenna winding is connected to be energized from one of said signal paths and wherein both of said two additional antenna windings are connected to be energized from another of said signal paths.]

[6. An article theft detection system according to claim 2 wherein separate phase shifters are provided in said one and another signal paths.]

[7. An article theft detection system according to claim 6 wherein one of said separate phase shifters is operative to produce a leading phase shift of approximately 45° and the other phase shifter is operative to produce a lagging phase shift of approximately 45°.]

[8. An article theft detection system according to claim 6 wherein said phase shifters have complementary frequency sensitivity characteristics whereby the same net phase difference is maintained at different signal frequencies.]

[9. An article theft detection system according to claim 6 wherein one phase shifter comprises a resistor and a capacitor connected in parallel with each other along one of said signal paths and said other phase shifter comprises a resistor and an inductor connected in parallel with each other along said another signal path.]

[10. Apparatus for generating an electromagnetic interrogation field at a given checkpoint through which protected articles must pass, said apparatus comprising at least two antenna windings lying in different planes in the vicinity of said checkpoint and means for applying electromagnetic signals of the same frequency but in phase shifted relationship simultaneously to said antennas.]

[11. Apparatus according to claim 10 wherein said antenna windings lie in planes which are substantially perpendicular to each other and wherein said means for applying electromagnetic signals includes phase shifter means operative to maintain a substantially 90° relative phase shift between the signals applied to the antennas in different planes.]

[12. An article theft detection system comprising a variable frequency oscillator, a tuning oscillator connected to said variable frequency oscillator for causing same to produce an output signal whose frequency varies cyclically at a rate corresponding to the frequency of said tuning oscillator, means defining an output signal path including a first junction connected to the output of said variable frequency oscillator and means forming a pair of branch signal paths leading from said first junction to associated antenna junctions, separate antenna windings connected respectively to said antenna junctions, said antenna windings being positioned at a given checkpoint and lying in different planes, detector means connected to said antenna junctions, said detector means being responsive to the changes in energy level at the junctions which occur at a rate related to the frequency of said tuning oscillator to produce an output signal, alarm means arranged to be actuated by said output signal from said detection means and phase shifter means arranged in at least one of said branch signal paths between said first junction and one of said antenna junctions.]

[13. An Article Theft Detection System according to claim 12 wherein said antenna windings include a first winding lying in a plane transverse to an egress path and a second winding lying in a plane extending laterally of said egress path.]

[14. An article theft detection system according to claim 13 wherein said phase shifter means is operative to produce a net phase difference in signals applied to said first and second windings of substantially 90°.]

[15. An article theft detection system according to claim 12 wherein said phase shifter means includes a pair of phase shifters each connected along a different one of said branch signal paths, one of said phase shifters being operative to produce a leading phase shift and the other being operative to produce a lagging phase shift.]

[16. An article theft detection system according to claim 15 wherein one of said phase shifters comprises a resistor and a capacitor connected in parallel with each other along one of said branch signal paths and the other phase shifter comprises a resistor and an capacitor connected in parallel with each other along the other of said branch signal paths.]

[17. An Article Theft Detection System according to claim 12 where said detector means comprises separate detector devices connected, respectively, to each of said antenna junctions.]

[18. A method for generating an electromagnetic interrogation field at a given checkpoint through which protected articles provided with electronic responder circuits must pass, said method comprising the step of electrically energizing antenna coils, positioned in different planes at said checkpoint, at the same frequency but at different phases thereby to generate an electromagnetic field which rotates in the vicinity of the checkpoint.]

[19. A method according to claim 18 wherein said coils lie in planes which are mutually perpendicular and wherein said coils are energized 90° out of phase with respect to each other.]

*20. An article theft detection system comprising an oscillator, means defining an output signal path including a first junction connected to the output of said oscillator and means forming a pair of branch signal paths leading from*

*said first junction to first and second antenna junctions, separate antenna windings connected respectively to said antenna junctions, said antenna windings being positioned at a given checkpoint and lying in different planes, detector means connected to each of said antenna junctions, said detector means being responsive to predetermined changes in energy level at the antenna junctions to produce an output signal, alarm means arranged to be actuated by said output signal from said detection means and phase shifter means arranged in at least one of said branch signal paths between said first junction and one of said antenna junctions.*

*21. An article theft detection system according to claim 20 wherein said antenna windings include a first winding lying in a plane transverse to an egress path and a second winding lying in a plane extending laterally of said egress path.*

*22. An article theft detection system according to claim 21 wherein said phase shifter means is operative to produce a net phase difference in signals applied to said first and second windings of substantially 90°.*

*23. An article theft detection system according to claim 22 wherein said phase shifter means comprises separate phase shifters provided in each of said branch signal paths.*

*24. An article theft detection system according to claim 23 wherein one of said separate phase shifters is operative to produce a leading phase shift of approximately 45° and the other phase shifter is operative to produce a lagging phase shift of approximately 45°.*

*25. An article theft detection system according to claim 23 wherein said phase shifters have complementary frequency sensitivity characteristics whereby the same net phase difference is maintained at different signal frequencies.*

*26. An article theft detection system according to claim 24 wherein one phase shifter comprises a resistor and a capacitor connected in parallel with each other along one of said signal paths and said other phase shifter comprises a resistor and an inductor connected in parallel with each other along the other signal path.*

*27. An article theft detection system according to claim 20 wherein said phase shifter means includes a pair of phase shifters each connected along a different one of said branch signal paths, one of said phase shifters being operative to produce a leading phase shift and the other being operative to produce a lagging phase shift.*

*28. An article theft detection system according to claim 27 wherein one of said phase shifters comprises a resistor and a capacitor connected in parallel with each other along one of said branch signal paths and the other phase shifter comprises a resistor and a capacitor connected in parallel with each other along the other of said branch signal paths.*

*29. An article theft detection system according to claim 20 wherein said detector means comprises separate detectors connected, respectively, to each of said antenna junctions.*

*30. An article theft detection system according to claim 20 wherein said antenna windings include a first winding encircling an egress path through said checkpoint and connected to said first antenna junction and second and third windings positioned parallel to and on opposite sides of said egress path, respectively, said second and third windings being connected to said second antenna junction.*

*31. An article theft detection system according to claim 20 wherein said oscillator is a variable frequency oscillator arranged to be tuned by a tuning oscillator for causing said variable frequency oscillator to produce an output signal whose frequency varies cyclically at a rate corresponding to the frequency of said tuning oscillator and wherein said detector means is responsive to the changes in energy level at the junctions which occur at a rate related to the frequency of said tuning oscillator to produce an output signal.*

*32. An article theft detection system according to claim 31 wherein said antenna windings include a first winding lying in a plane transverse to an egree path and a second winding lying in a plane extending laterally of said egress path.*

*33. An article theft detection system according to claim 32 wherein said phase shifter means is operative to produce a net phase difference in signals applied to said first and second windings of substantially 90°.*

*34. An article theft detection system according to claim 32 wherein said detector means comprises separate detector devices connected, respectively, to each of said antenna junctions.*

*35. An article theft detection system according to claim 31 wherein said phase shifter means includes a pair of phase shifters each connected along a different one of said branch signal paths, one of said phase shifters being operative to produce a leading phase shift and the other being operative to produce a lagging phase shift.*

*36. An article theft detection system according to claim 35 wherein one of said phase shifters comprises a resistor and a capacitor connected in parallel with each other along one of said branch signal paths and the other phase shifter comprises a resistor and a capacitor connected in parallel with each other along the other of said branch signal paths.*

*37. An article theft detection system according to claim 35 wherein said phase shifters have complementary frequency sensitivity characteristics whereby the same net phase difference is maintained at different frequencies.*

* * * * *